United States Patent
Wu (10) Patent No.: US 6,273,452 B1
(45) Date of Patent: Aug. 14, 2001

(54) STRUCTURE FOR GOLF CART

(76) Inventor: David Wu, No. 35-1, Jih-Hsin Street, Tu Cheng City, Taipei Hsien (TW)

( * ) Notice: Subject to any disclaimer, the term of this patent is extended or adjusted under 35 U.S.C. 154(b) by 0 days.

(21) Appl. No.: 09/526,890

(22) Filed: Mar. 16, 2000

(51) Int. Cl.$^7$ .................................................. B62B 1/04
(52) U.S. Cl. ..................... 280/652; 280/646; 280/DIG. 6
(58) Field of Search .................... 280/638, 639, 280/645, 646, 651, 652, 654, 655, 655.1, DIG. 6, 47.17, 47.24

(56) References Cited

U.S. PATENT DOCUMENTS

| | | | | |
|---|---|---|---|---|
| 5,281,044 | * | 1/1994 | Chen | 280/DIG. 6 |
| 5,288,099 | * | 2/1994 | Wu | 280/646 |
| 5,496,054 | * | 3/1996 | Wu | 280/646 |
| 5,582,372 | * | 12/1996 | Wu | 280/646 |
| 5,582,421 | * | 12/1996 | Liu | 280/646 |
| 5,683,195 | * | 11/1997 | Liao | 280/646 |
| 5,704,629 | * | 1/1998 | Wu | 280/646 |
| 6,017,052 | * | 1/2000 | Wu | 280/646 |

FOREIGN PATENT DOCUMENTS

| | | | | |
|---|---|---|---|---|
| 2649328 | * | 1/1991 | (FR) | 280/DIG. 6 |
| 2045697 | * | 11/1980 | (GB) | 280/646 |

* cited by examiner

*Primary Examiner*—Frank Vanaman
(74) *Attorney, Agent, or Firm*—Varndell & Varndell, PLLC (57) ABSTRACT

A folding collapsible frame structure for golf cart includes a main rod member holding a front bag cradle, a rear bag cradle, a wheel holder and a handle bracket, a handle pivoted to the handle bracket and turned between an operative position and a non-operative position. In the operative position, a hook at the handle is hooked up with a hook at the front bag cradle. In the non-operative position, the hook at the handle is disengaged from the hook at the front bag cradle. The front bag cradle is axially movably coupled to a front end of the main rod member by a slip joint, and a spring element is installed in the main rod member to impart a forward pressure to the front bag cradle and to maintain the front bag cradle in engagement with the hook at the handle.

1 Claim, 10 Drawing Sheets

STRUCTURE FOR GOLF CART

BACKGROUND AND SUMMARY OF THE INVENTION

The present invention relates to golf carts, and more specifically to a folding collapsible frame structure for golf cart, which saves much storage space when collapsed and, can easily be set between the operative position and the collapsed position.

Various folding collapsible golf carts have been disclosed, and have appeared on the market. Similar designs are seen in U.S. Pat. Nos. 5,249,822; 5,464,238; 5,704,629. However, these prior art designs have drawbacks. The drawbacks of the design of U.S. Pat. No. 5,249,822 (see FIGS. 1 and 2) are as follows:

1. When extended out, a gap exists between the main rod member and the coupling member, and coupling member tends to be vibrated with the handle on the main rod member after a long use of the golf cart, causing a noise.

2. The spring member wears quickly with use because it is frequently non-linearly stretched.

3. When collapsing the golf cart, the user must pull the coupling member with one hand, and turn the handle from the operative position to the collapsed position with the other hand.

4. The complicated folding collapsible arrangement greatly increases the manufacturing cost of the golf cart.

The drawbacks of the design of U.S. Pat. No. 5,464,238 (see FIGS. 3 and 4) are as follows:

1. Because the first locating member is made to slide on the handle, the user must check the direction before moving the first locating member.

2. Because the slide block is fixedly fastened to the first locating member by screw means and moved to slide on the handle connector at the rear end of the handle, and the spring is stopped between the handle connector and the first locating member, the first locating member tends to be vibrated when moved on the handle, causing a noise.

3. When extended out, no support means is provided to hold the front end of the main frame and the handle positively together.

4. Due to the limitation of the dimension of the second locating member, the handle can only be turned between a limited angle.

Figure 5:
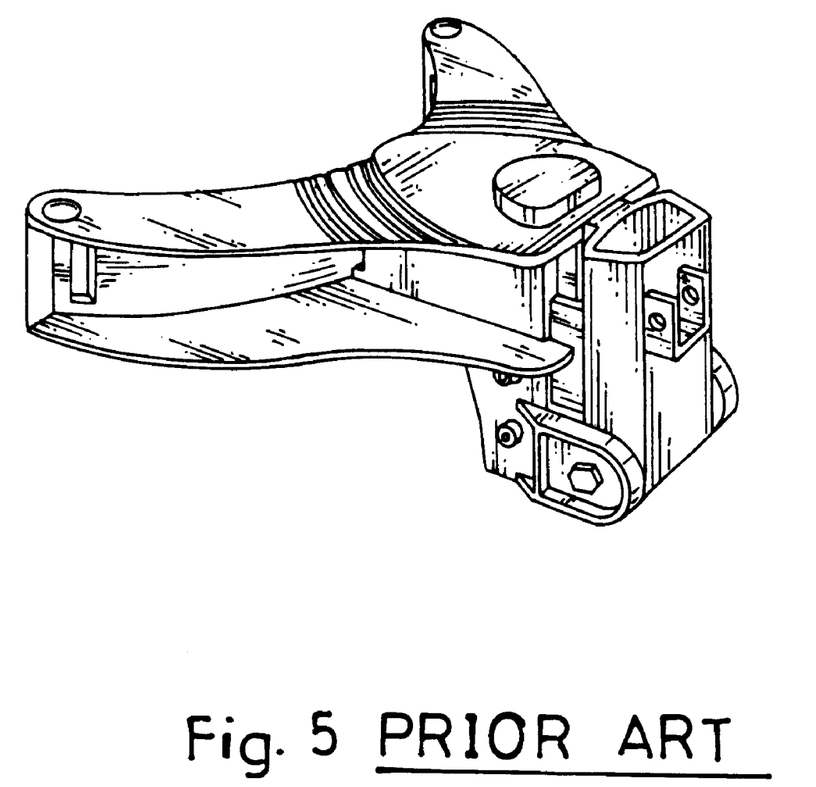
FIG. 5 is a perspective view of a part of a folding collapsible frame structure for golf cart according to U.S. Pat. No. 5,704,629.
Figure 6:
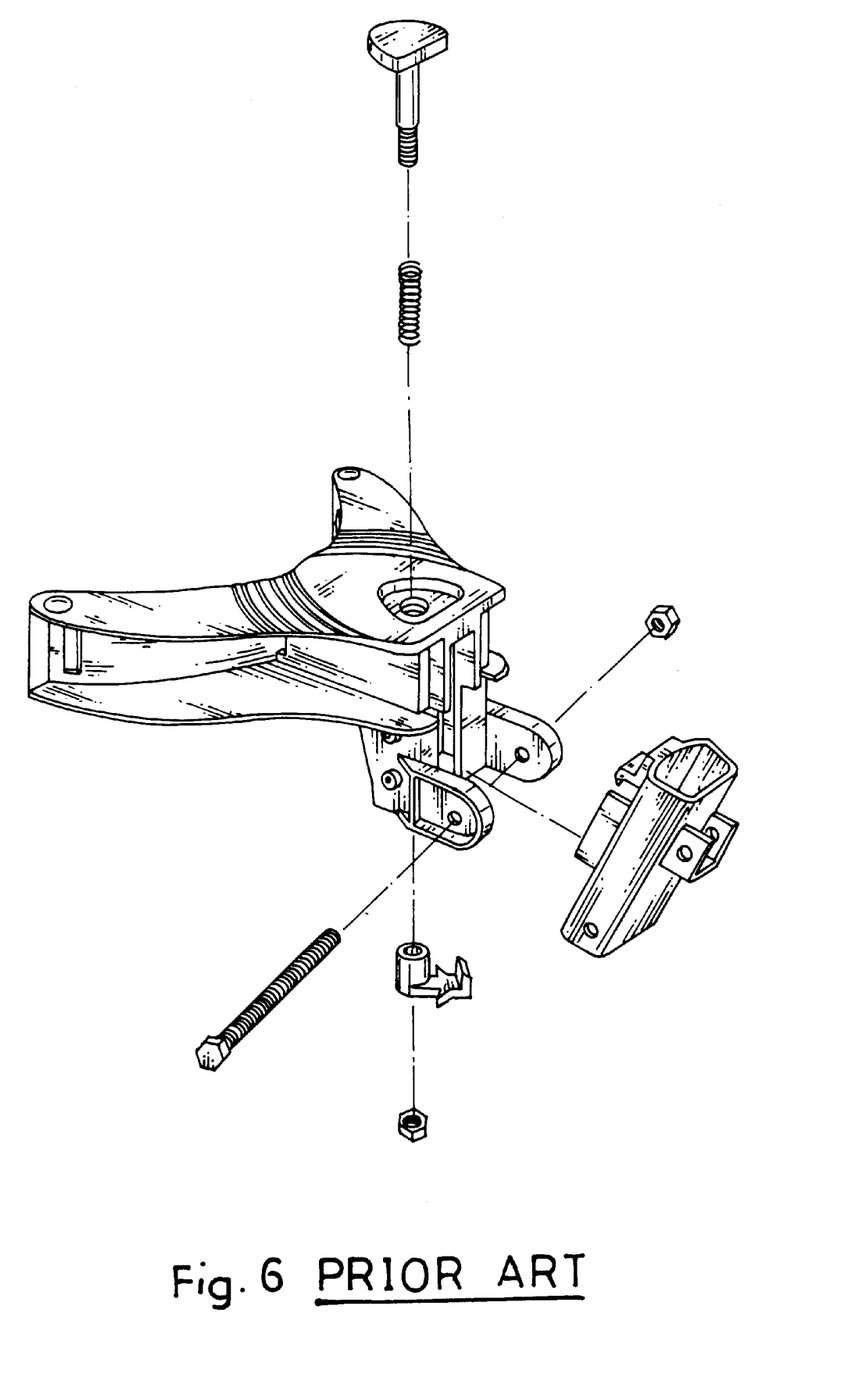
FIG. 6 is an exploded view of the assembly shown in FIG. 5.
Figure 7:
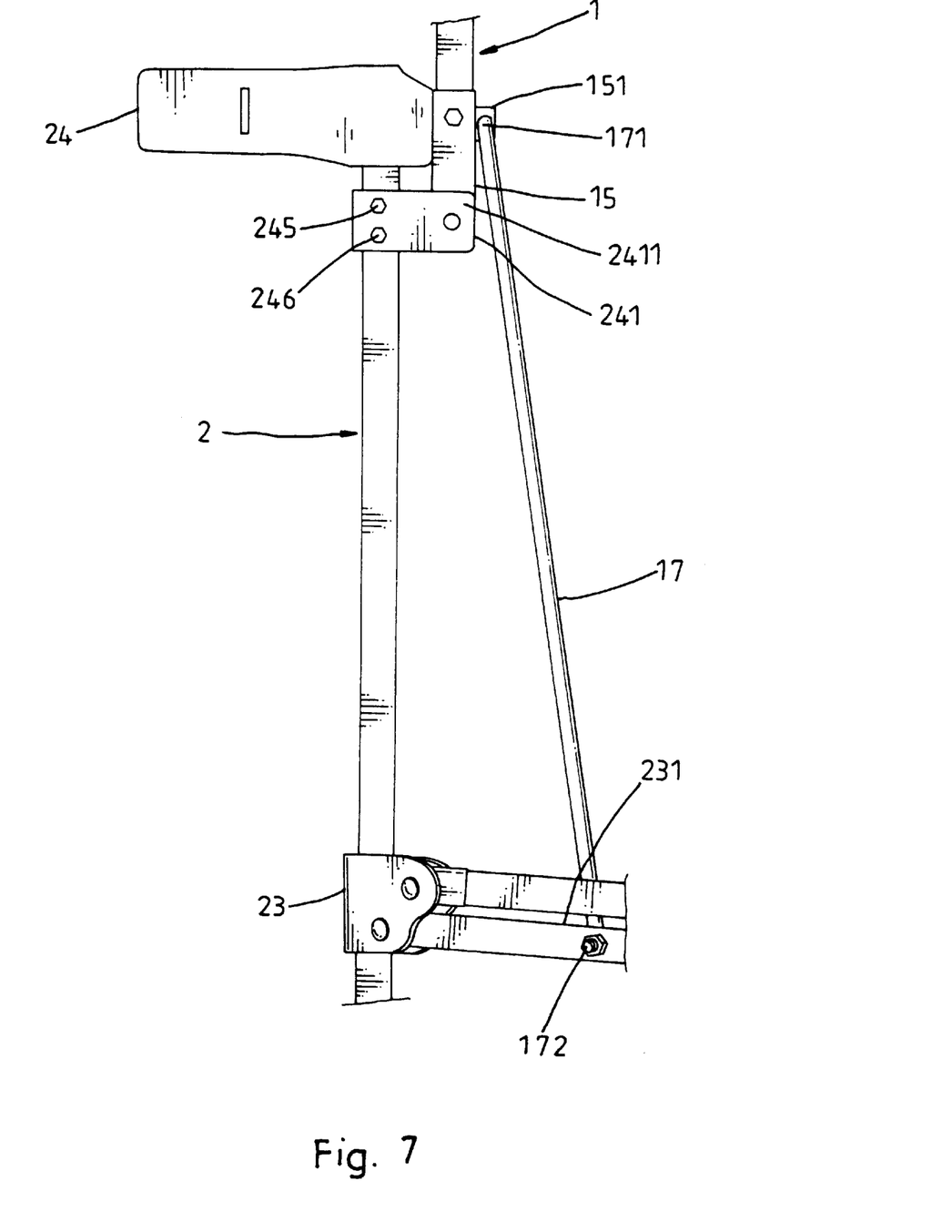
FIG. 7 is a side view of a folding collapsible frame structure for golf cart according to the present invention when extended out.

The drawbacks of the design of U.S. Pat. No. 5,704,629 (see FIGS. 5 and 6) are as follows:

1. The user of the press control member and the retainer member greatly complicates the assembly procedure of the golf cart, and increases its manufacturing cost.

2. The operation procedure is still complicated because the press control member must be depressed to disengage the retainer member from the hook of the handle connector at the handle when collapsing the frame structure.

3. When collapsed, the press control member protrudes over the front side wall of the front bag cradle, and much storage space is required.

The present invention provides a folding collapsible frame structure for golf cart, which eliminates the drawbacks of the aforesaid prior art designs. According to the present invention, the folding collapsible frame structure comprises a main rod member holding a front bag cradle, a rear bag cradle a wheel holder and a handle bracket, a handle pivoted to the handle bracket and turned between the operative position where a hook at the handle is hooked up with a hook at the front bag cradle, and the non-operative position where the hook at the handle is disengaged from the hook at the front bag cradle, wherein the front bag cradle is axially movably coupled to a front end of the main rod member by a slip joint, and spring means is installed in the main rod member to impart a forward pressure to the front bag cradle and to support the front bag cradle in engagement with the hook at the handle. The design of folding collapsible frame structure is less expensive because it uses less number of parts. Because the front bag cradle is supported on the spring at the main rod member, and has a hook formed integral with the bottom side wall thereof for engagement with the hook at the handle connector, the operation procedure is simple. When pulling the front bag cradle backwards, the handle is released from the locking position for turning from the operative position to the collapsed position. Further, when collapsed, no protruding member at the front side of the front bag cradle, and less storage space is needed.

DETAILED DESCRIPTION OF THE PREFERRED EMBODIMENT

Figure 1:
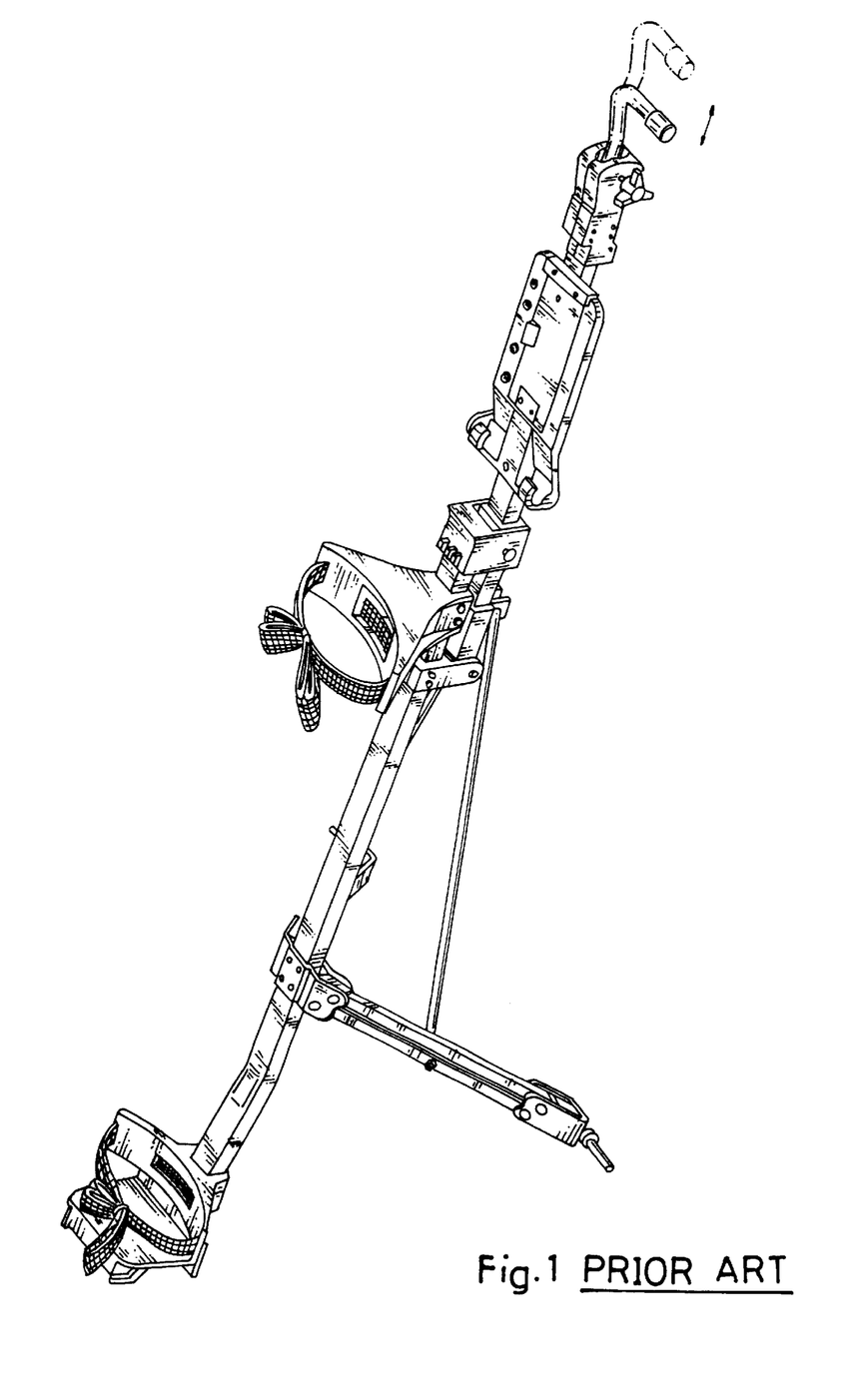
FIG. 1 is a perspective view of a folding collapsible frame structure for golf cart according to U.S. Pat. No. 5,249,822.
Figure 2:
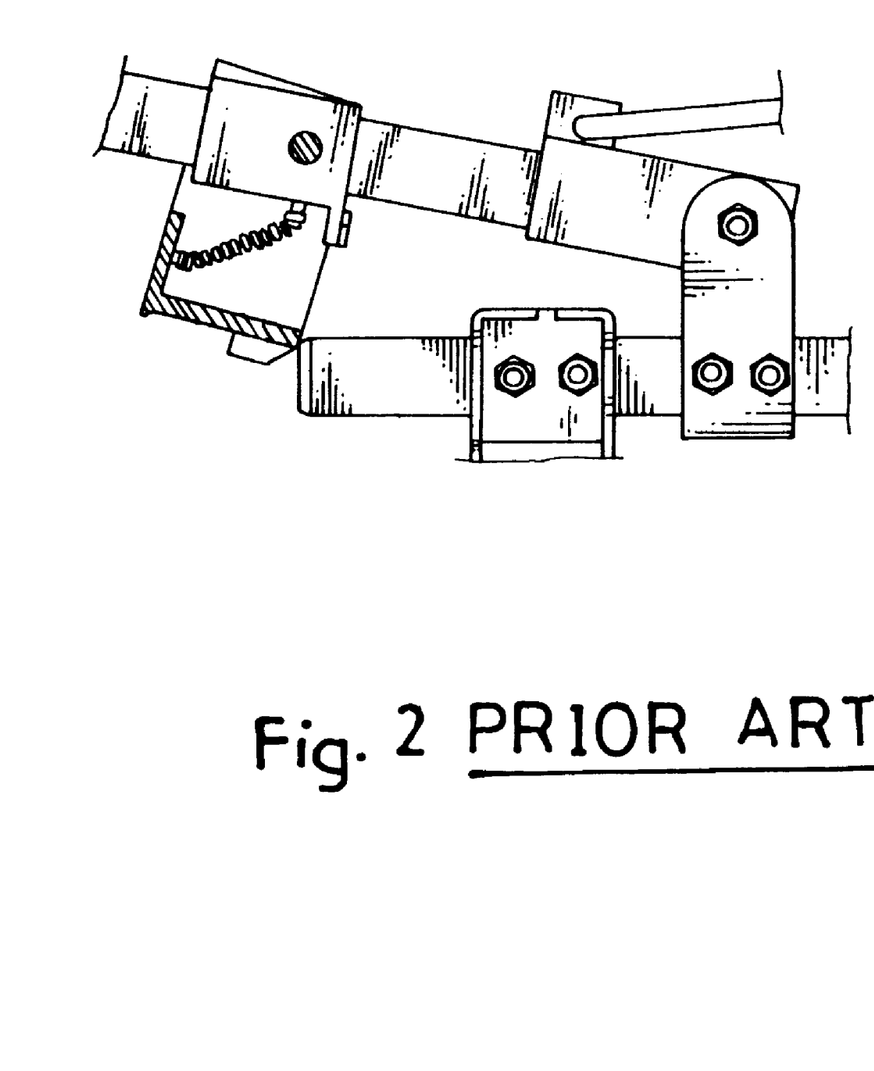
FIG. 2 is a side view in an enlarged scale of a part of the folding collapsible frame structure for golf cart according to U.S. Pat. No. 5,249,822.
Figure 3:
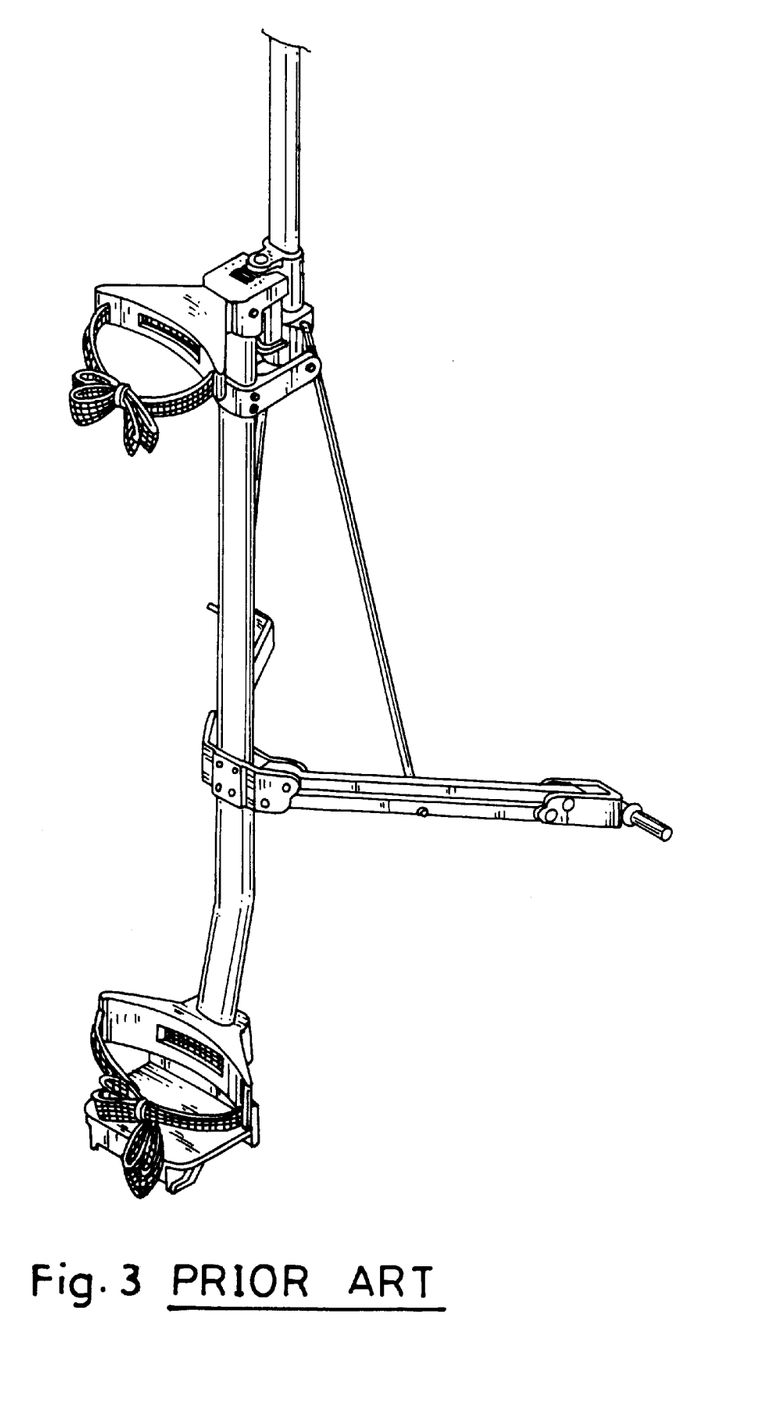
FIG. 3 is a perspective view of a folding collapsible frame structure for golf cart according to U.S. Pat. No. 5,464,238.
Figure 4:
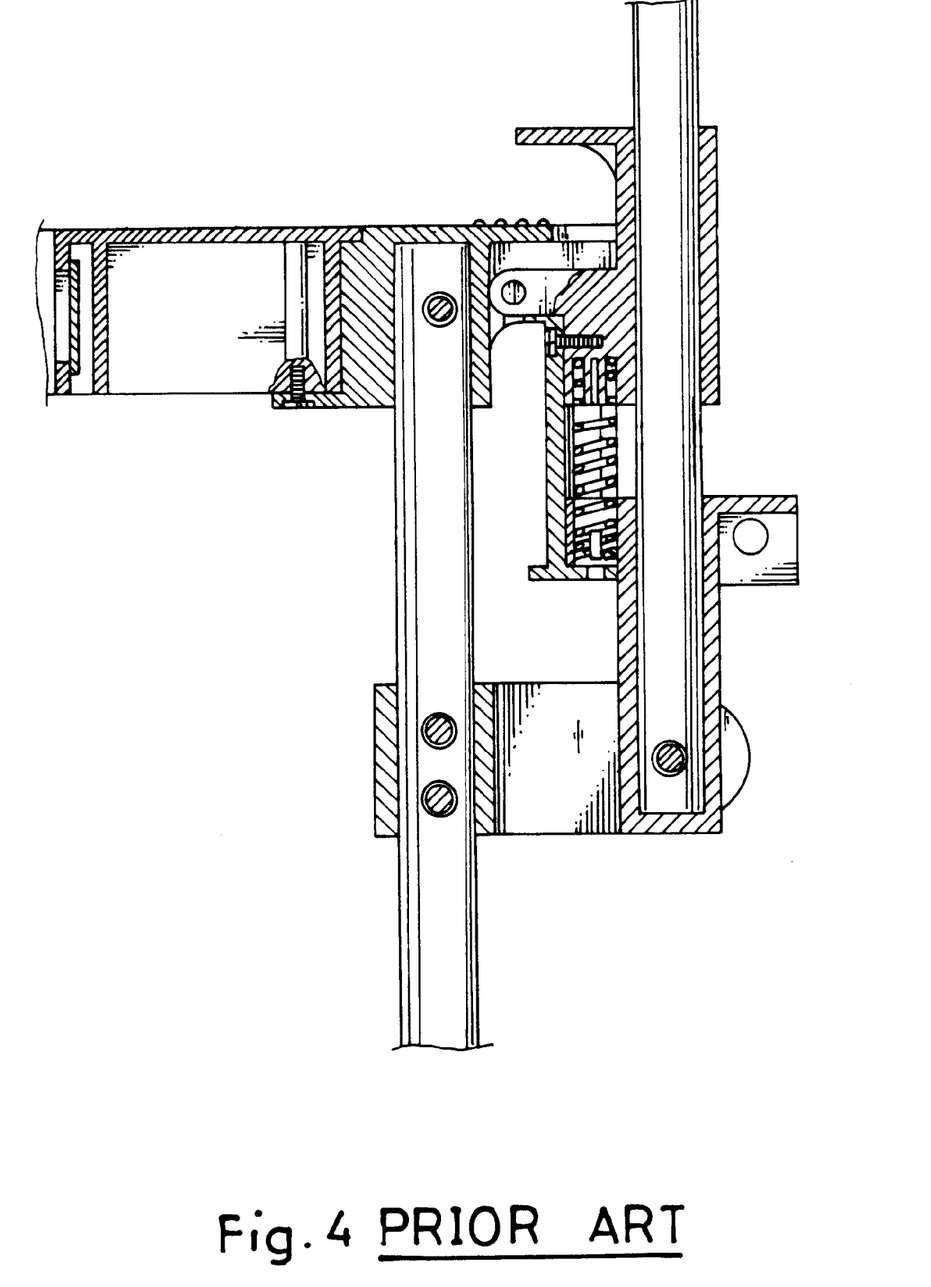
FIG. 4 is a sectional view in an enlarged scale of a part of the folding collapsible frame structure for golf cart shown in FIG. 3.

Referring to FIGS. from 7 through 10, a folding collapsible frame structure for a golf cart is shown comprised of a handle 1, a handle connector 15, a tubular main rod member 2, a handle bracket 241, a spring 16, a wheel holder 23, two links 17, a front bag cradle 24, and a rear bag cradle. The rear bag cradle can have a structure as shown in FIGS. 1 and 3. The handle can have a handle grip as shown in FIG. 1.

The handle 1 has a front end fixedly mounted with a handgrip (not shown), and a rear end fixedly fastened to the handle connector 15. The front bag cradle 24 and the rear bag cradle are respectively mounted on the front and rear ends of the main rod member 2. The wheel holder 23 is fixedly mounted on the main rod member 2 between the front bag cradle 24 and the rear bag cradle, having two pivoted wheel holder bars 231. The handle bracket 241 is fixedly fastened to the main rod member 2 by fastening elements 245 and 246 and disposed adjacent to the front bag cradle 24, having two parallel lugs 2411. The handle connector 15 is pivoted to the two parallel lugs 2411 of the handle bracket 241, having two lugs 151 bilaterally disposed at a back side thereof and respectively pivoted to the links 17, and a hook 150 disposed at a front side thereof. The hook 150 has a hooked front end 1501. The links 17 each have a front end 171 pivoted to one lug 151 of the handle connector 15, and a rear end 172 pivoted to one wheel holder bar 231.

The main feature of the present invention is outlined hereinafter with reference to FIGS. from 7 through 10 again, the front bag cradle 24 comprises a bottom hook 261 having a hooked front end 2611 for engagement with the hooked front end 1501 of the hook 150 of the handle connector 15, and a longitudinally backwardly extended coupling hole 242, which receives the front end of the main rod member 2. a pivot pin 240, which passes through a longitudinal sliding slot 25 on the main rod member 2 to secure the front bag cradle 24 and the main rod member 2 together, enabling the front bag cradle 24 to be moved axially on the main rod member 2 within a limited distance, and inside stop flanges 2421 suspended in the front end of the main rod member 2. The spring 16 is mounted inside the main rod member 2, having one end connected to the stop flanges 2421 and an opposite end connected to one fastening element 245.

Figure 8:
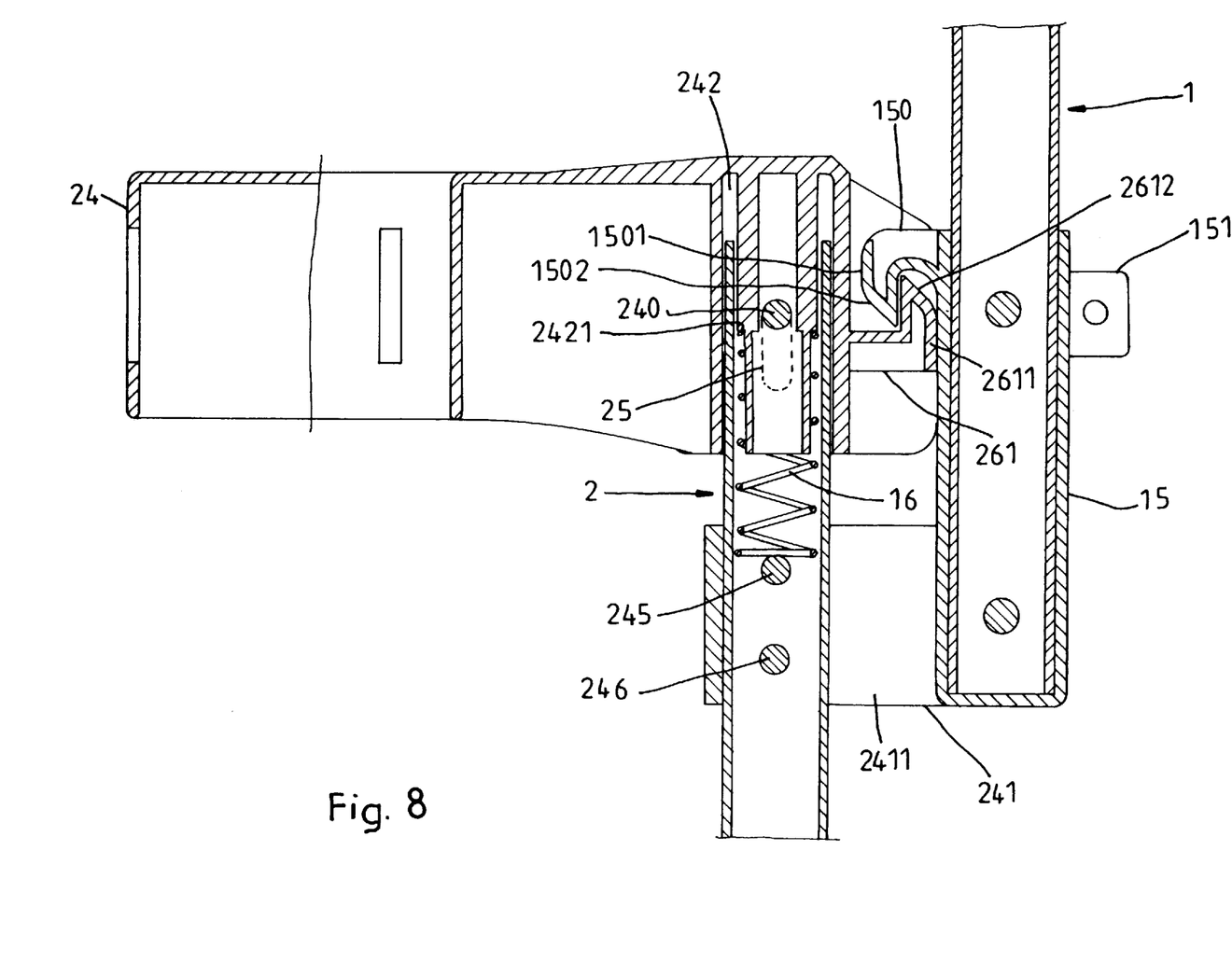
FIG. 8 is a sectional view in an enlarged scale of a part of FIG. 7.
Figure 9:
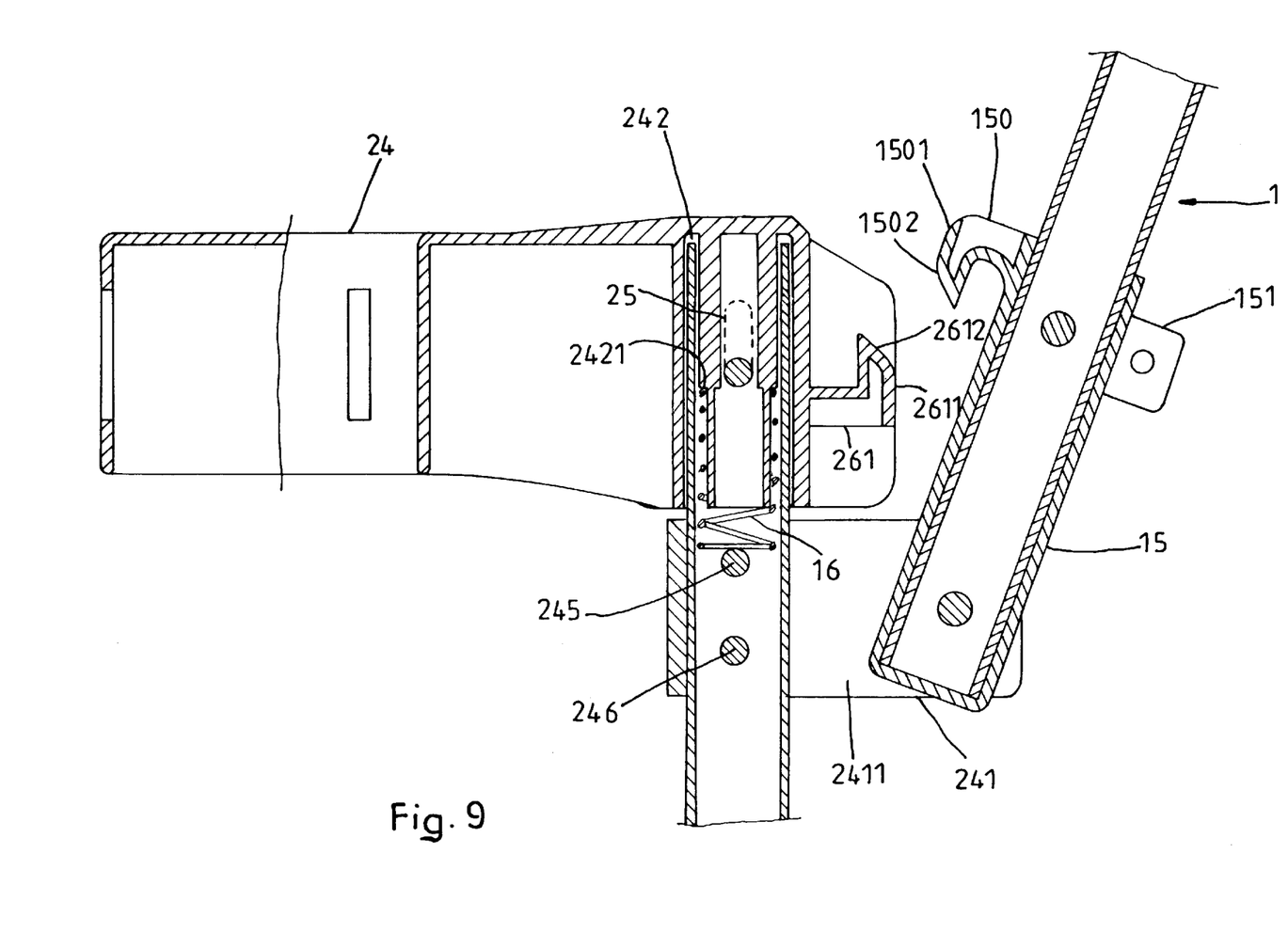
FIG. 9 is another sectional view in an enlarged scale of a part of the present invention, showing the hook at the handle connector disengaged from the hook at the front bag cradle, the handle turned outwards from the front bag cradle.
Figure 10:
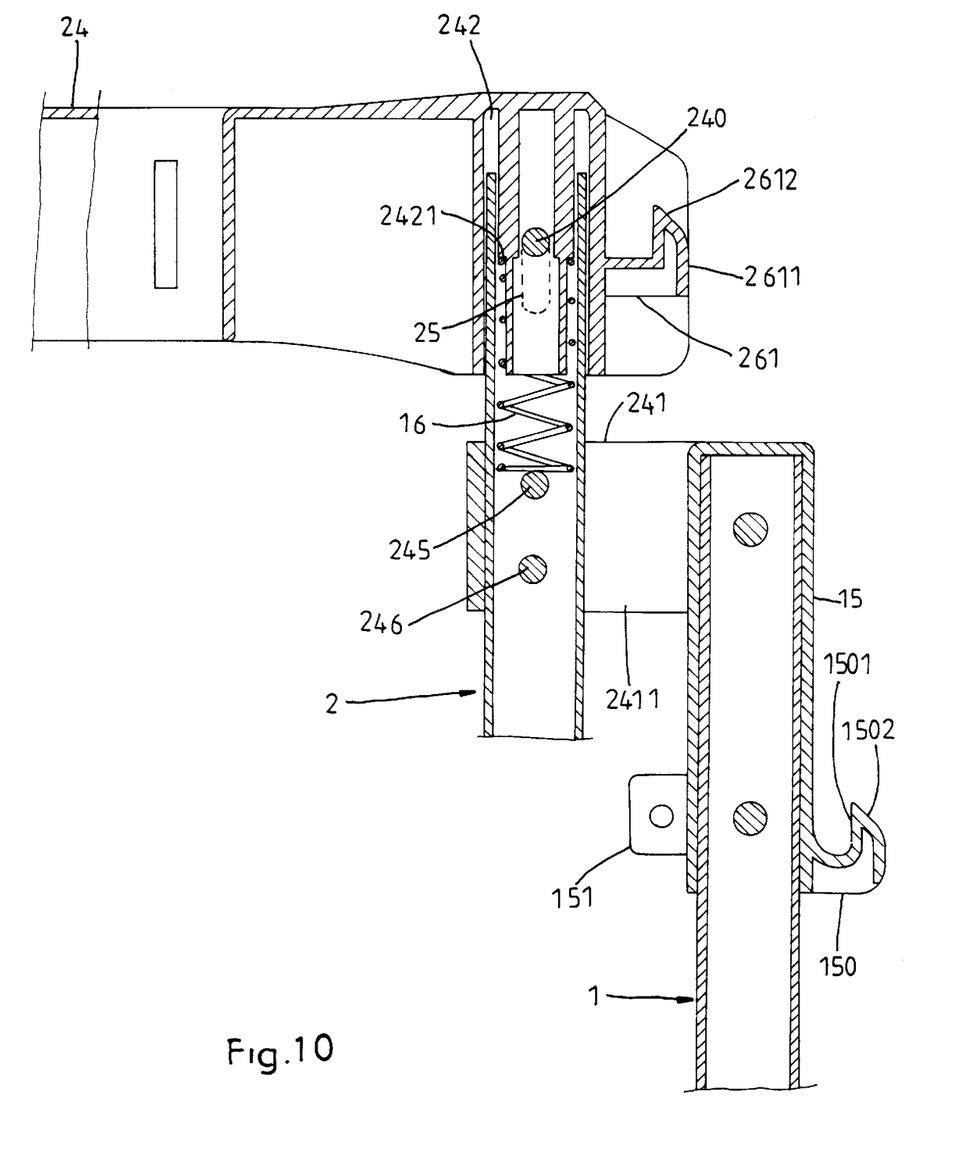
FIG. 10 is still another sectional view in an enlarged scale of a part of the present invention, showing the handle turned to the collapsed position.

When collapsing the frame structure, the front bag cradle 24 is forced axially backwards against the spring force of the spring 16 to disengage the hook 261 from the hook 150 at the handle connector 15 (see FIG. 9), enabling the handle 1 to be turned with the handle connector 15 from the operative position shown in FIG. 8 to the collapsed position shown in FIG. 10, and at the same time the links 17 are forced by the lugs 151 of the handle connector 15 to move the frame holder bars 231 to the collapsed position. When turning the frame structure from the collapsed position to the operative position, the beveled front guide edge 1502 of the hooked front end 1501 of the hook 150 is moved with the handle connector 15 along the beveled front guide edge 2612 of the hooked front end 2611 of the hook 261 at the front bag cradle 24, enabling the hook 150 of the handle connector 15 to be forced into engagement with the hook 261 at the front bag cradle 24 (see FIGS. 7 and 8).

What is claimed is:

1. A folding collapsible frame structure for golf cart comprising:

a tubular main rod member, said tubular main rod member having a front end and a rear end;

a front bag cradle mounted on the front end of said tubular main rod member, said front bag cradle comprising a bottom hook;

a rear bag cradle fixedly mounted on the rear end of said tubular main rod member;

a wheel holder fixedly mounted on said tubular main rod member between said front bag cradle and said rear bag cradle, said wheel holder comprising two pivoted wheel holder bars;

a handle bracket mounted on said tubular main rod member adjacent to said front bag cradle;

fastening means fastened to said handle bracket and said tubular main rod member to fixedly secure said handle bracket and said tubular main rod member together;

a handle, said handle having a front end terminating in a handgrip and a rear end; and a handle connector fixedly mounted on the rear end of said handle and pivoted to said handle bracket for enabling said handle to be turned between an operative position and a non-operative position, said handle connector comprising a front hook, which is forced into engagement with the hook at said front bag cradle when said handle is moved to the operative position;

wherein said tubular main rod member comprises a longitudinal sliding slot on the front end; said front bag cradle comprises an axially backwardly extended coupling hole, which receives the front end of said tubular main rod member, a pivot pin, which passes through the longitudinal sliding slot on said main rod member to secure said front bag cradle and said main rod member together, enabling said front bag cradle to be moved axially on said main rod member within a limited distance, an inside stop flange suspended in said tubular main rod member, and spring means mounted inside said tubular main rod member and connected between said inside stop flange and said fastening means to force said front bag cradle forwards and to support said front bag cradle in engagement with the hook at said handle connector.

* * * * *